United States Patent [19]

Eichholz et al.

[11] 4,011,126

[45] Mar. 8, 1977

[54] DRUM FOR PRODUCING BLANKS FOR CAR TIRES

[75] Inventors: Werner Eichholz; Gerd Krebs, both of Hamburg, Germany

[73] Assignee: Phoenix Gummiwerke A.G., Hamburg, Germany

[22] Filed: Feb. 28, 1975

[21] Appl. No.: 553,880

[30] Foreign Application Priority Data

Mar. 1, 1974 Germany .......................... 2409737

[52] U.S. Cl. .................................. 156/416; 92/45; 156/398; 248/400; 267/35

[51] Int. Cl.² ......................................... B29H 17/26

[58] Field of Search ... 156/131, 398, 403, 414–420; 74/585, 521; 248/400; 267/21 R, 35, 57.1 R, 63, 65 R, 69; 92/34, 35, 43, 44

[56] References Cited

UNITED STATES PATENTS

| | | | |
|---|---|---|---|
| 3,107,192 | 10/1963 | McNenney | 156/415 |
| 3,518,149 | 6/1970 | Mirtain | 156/416 |
| 3,580,782 | 5/1971 | Leblond | 156/415 |
| 3,862,871 | 1/1975 | Held et al. | 156/415 |

*Primary Examiner*—William A. Powell
*Assistant Examiner*—John E. Kittle

[57] ABSTRACT

A drum for producing blanks for car tires of rubber with straps wherein the drum consists of coaxial rings movable axially relatively to each other and having supporting surfaces for the beads of tire blanks. According to the invention each ring has an annular groove containing a ring insert of an elastomeric material with a high E-modul. The insert is radially stretchable and consists of a cylindrical supporting part and a disk part firmly connected therewith. The disk part in cross-section has a toggle-like bend and is supported upon the base of the groove. The supporting part is fixed to a limiting flange.

1 Claim, 4 Drawing Figures

DRUM FOR PRODUCING BLANKS FOR CAR TIRES

This invention relates to a drum for producing blanks for car tires of rubber with straps, whereby the drum consists of rings movable axially to each other and having supporting surfaces for the beads of tire blanks.

As is known, the making of tire blanks with breaker strips consists now of two steps.

In the first step a cylindrical shaping body for the tire is produced consisting of a base and bead supports.

In the second step this cylindrical raw body is changed by pressure into a torus-shaped body and is pressed into the annular belt; thereupon the tread rubber is applied.

The present invention pertains only to the second step of this manufacturing procedure.

As a rule, this manufacturing step is carried out with the above-described drum. The tire blank is placed upon two coaxial supporting rings having fixed diameters, which are movable axially relatively to each other. During the axial shifting the supporting rings move into engagement with the beads at a fixed inner distance. The supporting rings are so dimensioned and arranged that the raw tire is placed in a precisely fixed position. Due to this fixed position it is possible to place the belt insert and the tread rubber precisely in the middle section of the raw body. Small deviations from the predetermined position already produce lateral and/or radial swinging in the raw tire. When the tire is finished these swingings will then also take place.

Since the supporting rings of the drum require a fixed seat relatively to the beads constituting a seal when operating without bellows, the required measure tolerances may cause that the raw part will not be pushed precisely into its end position. It is not always possible for the operators at the drum to recognize these small deviations of location at the supporting rings with sufficient precision. The result is that during tire manufacture some tires are produced which have lateral and/or radial swingings. These swingings can be only partly eliminated by subsequent treatment. Tires the swingings of which exceed a certain amount are not useable.

An object of the present invention is the provision of a drum of the described type which avoids with safety an erroneous mounting of raw tires upon the drum.

Another object is to make simpler the working with the drum and to lower the costs.

Other objects of the present invention will become apparent in the course of the following specification.

In the accomplishment of the objectives of the present invention it was found desirable to provide the rings with annular grooves containing ring inserts of an elastomeric material with a high E-modul. The insert is radially stretchable and consists of a cylindrical supporting part and a disk part firmly connected therewith. The disk part in cross-section has a toggle-like bend and is supported upon the base of the groove. The supporting part is fixed to a limiting flange.

These two inserts which may be shifted to a predetermined extent make it possible to greatly simplify the application of the raw tire, since the inserts can have a circumference which is smaller than that required for the breaker strip. When the inserts are shifted, an extension takes place which is uniformly divided along the entire circumference and which fixes the blank precisely in the predetermined location. Since limiting flanges operate along with the moving inserts, a precise position can be provided with perfect safety. Furthermore, the moving of the inserts of elasomeric material makes it possible to balance tolerances in the diameter of the tire blank by their elastic properties. The E-modul is about 800. To attain this modul polyesterurethane or the like, having a hardness of about 80 shore is used as the material. The use of the E-modul makes possible the required pressure on the blank. This provides a further improvement of the tire in the blank range. For shifting air pressure is necessary which complies with the requirements. A special shaping of the disk part will suffice for the use of the usual pressure for the shifting.

The double tensioning results in that the spreading movement takes place precisely coaxial and perpendicular to the drum axis. The toggle-like construction in connection with the groove results in that a substantial pressure is applied upon a small surface with little exertion. This pressure becomes continuously greater due to the transmission ratio with the toggle lever, the greater is the outer extent of the supporting surface of the insert. The supporting surface remains precisely vertical in the two end positions and in the intermediate range.

To make certain that the spreading will remain the same for a long time period, the device has toggle joints at the toggle locations. The joints are closed in the spread condition, so that the entire pressure is available for the radial forces. The depth of these joints is set in connection with the thickness of walls of the device.

The invention will appear more clearly from the following detailed description when taken in connection with the accompanying drawing showing by way of example only, a preferred embodiment of the inventive idea.

In the drawing

Figure 1:
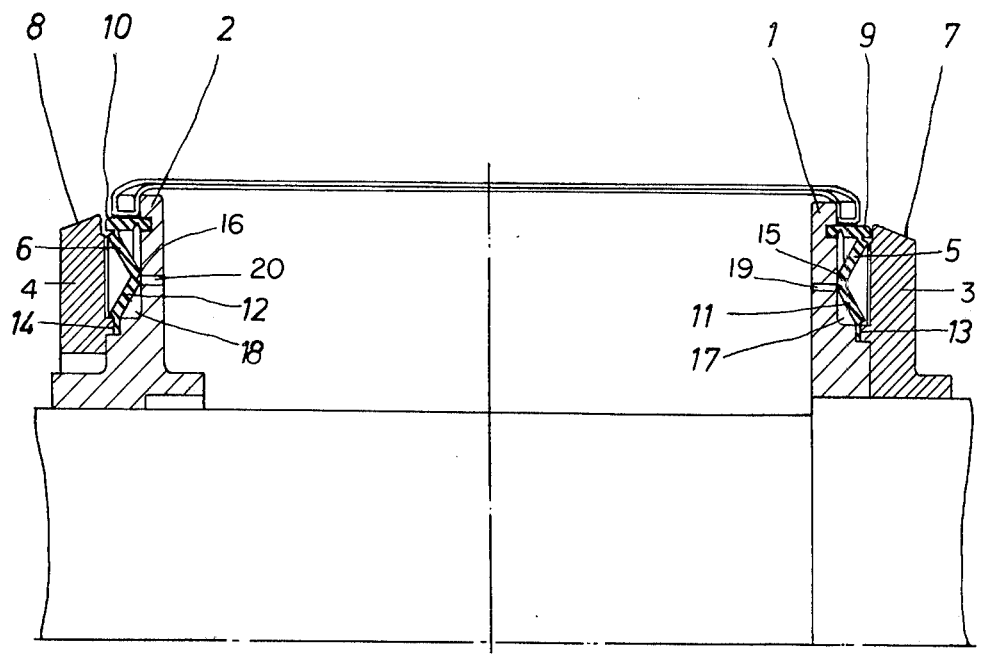
FIG. 1 is a section through a structural drum in axially stretched condition.
Figure 2:
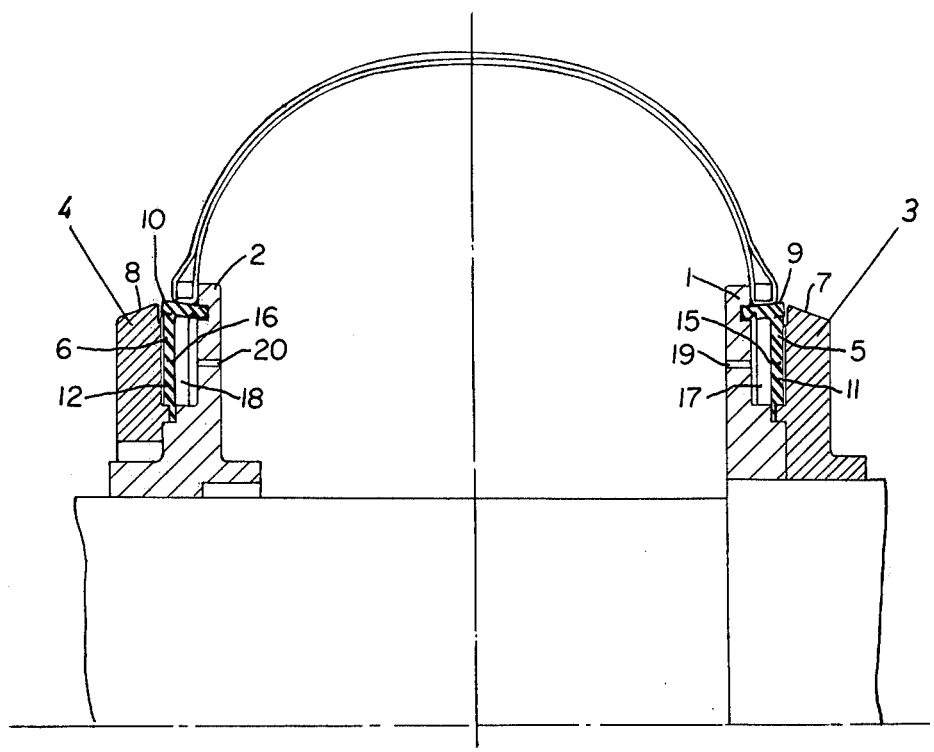
FIG. 2 shows the drum in its operating condition.
Figure 4:
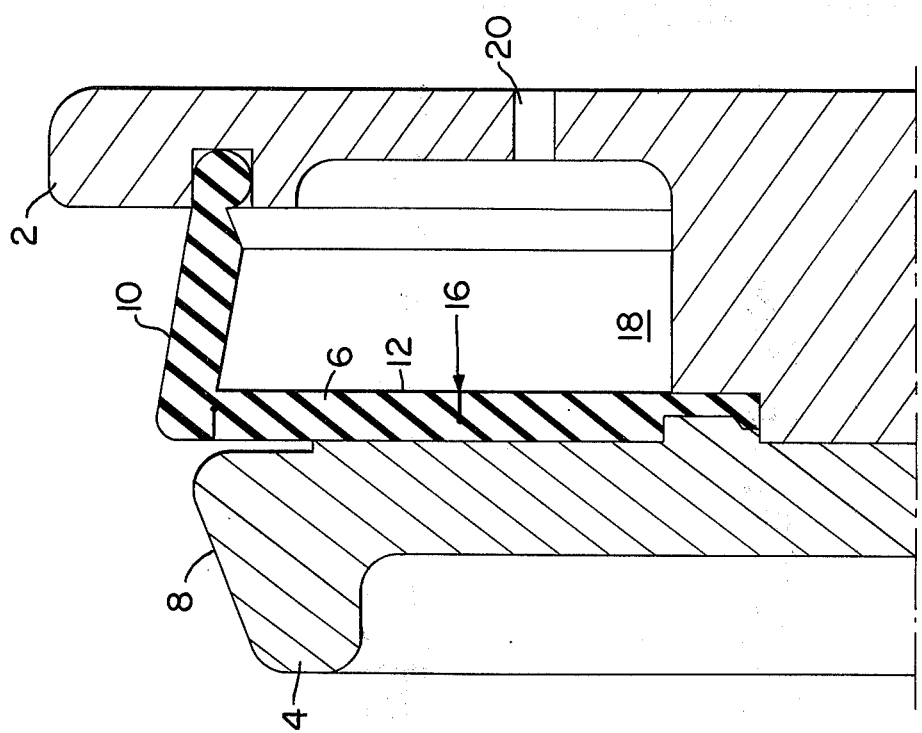
FIG. 4 is similar to FIG. 3 but shows the operating condition.
Figure 3:
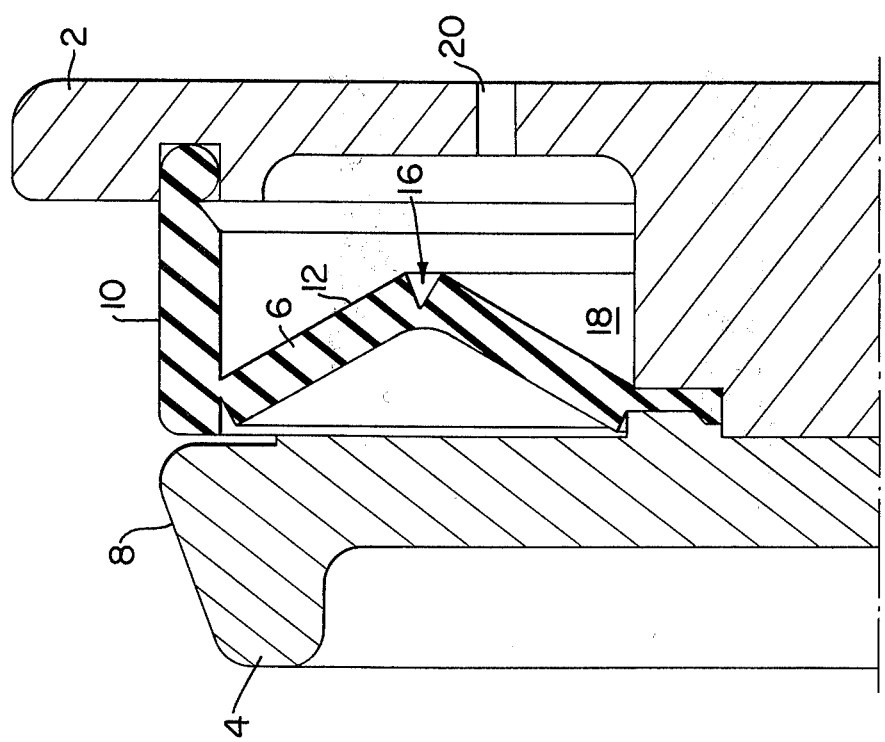
FIG. 3 is an enlarged section view illustrating the stretched condition.

FIG. 1 shows the drum as consisting substantially of two limiting flanges 1 and 2 and two guiding flanges 3 and 4. The flanges form jointly rings with annular grooves. When the raw tires are applied the limiting flanges 1 and 2 have a spacing corresponding to that of bead from bead of the raw tire in the cylindrical shaping. The two limiting flanges 1 and 2 lie against the inner sides of the tire bead during axial spreading. Then the beads are set in a firm and precise location, since the spreading supporting rings 5 and 6 have a smaller radial diameter than the beads. The raw tire slides over the surfaces 7 and 8 without being disturbed precisely into the predetermined position. The supporting surfaces 9 and 10 of the spreading rings are cylindrically shaped when they are not tensioned and continue as toggle-shaped disk parts 11 and 12. The lower ends are clamped between the limiting flanges 1 and 2 and the guiding flanges 3 and 4. The toggle-shaped ring parts 11 and 12 have toggle joints 15 and 16. When air is pressed into the spaces 17 and 18 through passages 19 and 20 the ring parts are stretched and at the same time the cylindrical supporting surfaces are radially spread. This condition is indicated in FIG. 2. Then the supporting surfaces acquire a slightly conical shape and provide a particularly precise and fixed location of the beads. The supporting rings are fixed at 13 and 14 to the flanges.

What is claimed is:

1. A device for producing blanks for car tires of rubber with braker strips, said device comprising a drum consisting of coaxial rings movable axially relative to each other, said rings having outer spaced flanges forming an annular groove in each ring, and a ring insert located in each groove and consisting of an elastomeric material, said ring insert comprising a top cylindrical supporting part and a bottom disc part connected by an integral joint with said supporting part at the axial outer edge of each supporting part and extending radially inward into said groove, said disc part having a joint therein forming a toggle-like bend in cross-section, said supporting parts being fixed to the axially outer face of the axially inner flange of each ring, said disc part extending to the bottom of said groove, means for applying fluid pressure into said groove to cause the radial expansion of said supporting parts at locations not fastened to said flanges by the air pressure causing the strengthening of the toggle-like bends in said disc parts.

* * * * *